Jan. 2, 1951   A. RAPPL   2,536,821
METHOD OF MAKING SHAFT BEARINGS
Filed July 16, 1945
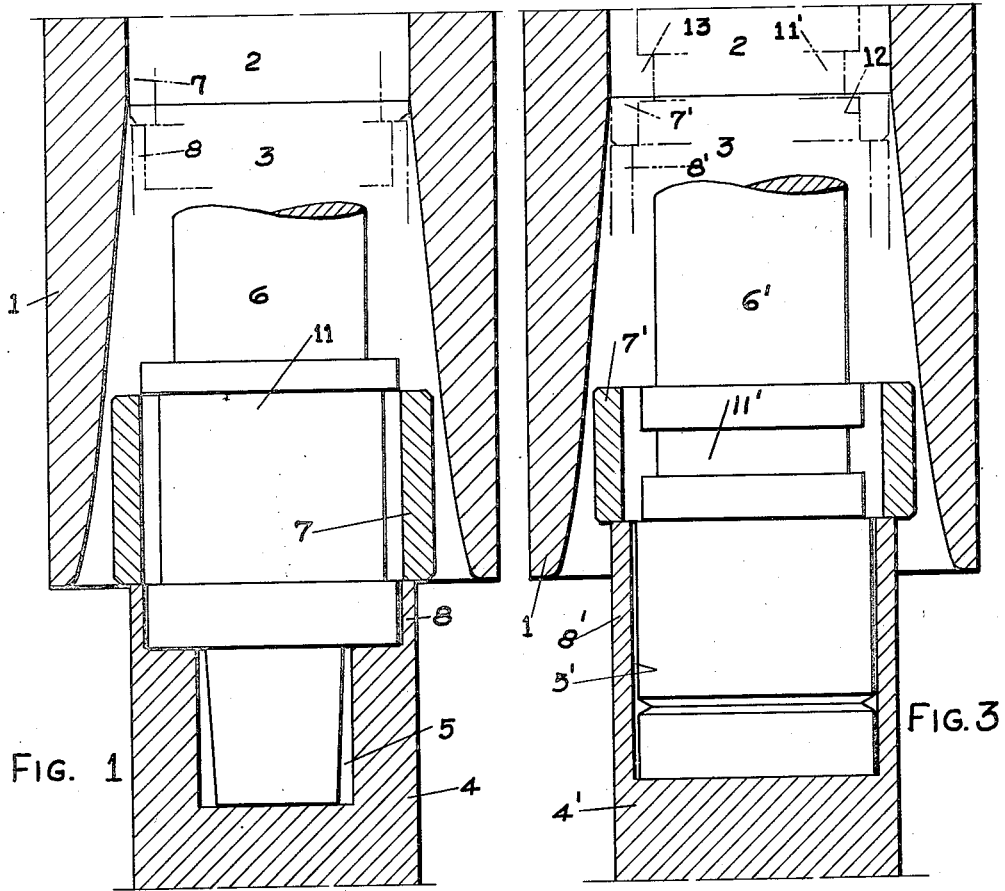
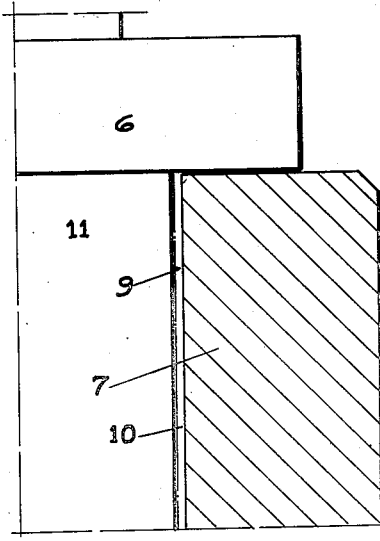
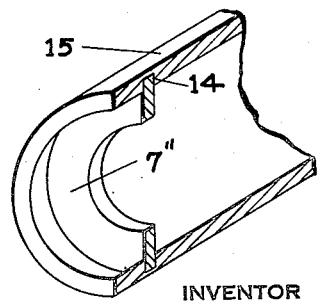
INVENTOR
Anton Rappl
BY
Beau, Brooks, Buckley Bean
ATTORNEY Patented Jan. 2, 1951

2,536,821

UNITED STATES PATENT OFFICE 2,536,821

METHOD OF MAKING SHAFT BEARINGS

Anton Rappl, Eggertsville, N. Y., assignor to Trico Products Corporation, Buffalo, N. Y.

Application July 16, 1945, Serial No. 605,355

3 Claims. (Cl. 29—149.5)

This invention relates to the machine art and particularly to a shaft mounting and the method of fabricating the same. In the prior art it has been customary to machine the inner diameter of a bushing to approximately the outer diameter of the shaft and then fitting the one on the other to provide journal support for the shaft. This machining operation is an exacting as well as an expensive one and the tolerance limits prescribed are difficult to secure. Consequently, the shaft frequently has greater play than is desired in its supporting bushings.

The object of the present invention is to simplify the method of mounting a bushing on its shaft so as to render the operation exceedingly simple and economical in practice. Further, the invention has for its object to provide a practical shaft mounting with a minimum clearance for the greatest efficiency in use and at the same time one which will enable ready production in large volume.

In the drawings:

Figure 1 is a diagrammatic view showing a simple arrangement for practicing the method of the present invention;

Fig. 2 is a much exaggerated view thereof, in fragment, placing emphasis on the elastic reaction in the bushing to secure the required minimum clearance in the journal bearing;

Fig. 3 shows a modified form of bushing; and

Fig. 4 shows a still further embodiment in which the bushing is internally disposed with respect to the rotatably supported part.

In carrying out the improved method, an annular bushing is formed from stock metal having a predetermined coefficient of expansion sufficient to provide a prescribed clearance about the shaft subsequent to the release of a compressive force employed in initially contracting the bushing thereon. Referring more particularly to the drawings, a tubular shrinking die 1, which may be suitably supported in a press or the like, has a cylindrical throat 2 with an internal diameter approximating that of the outside diameter of the completed bushing. An entranceway 3 in the form of an inwardly tapering passage leads to the throat and serves as means by which the bushing is readily introduced into the die. A plunger 4 is arranged for movement axially of the throat 2 and is designed to force the bushing axially into the die for being contracted by the latter to the required diameter. Preferably the plunger has a diameter sufficiently small to enable the plunger following the workpiece into the throat passage 2.

The workpiece herein depicted is in the form of a shaft 6 and the bushing 7 is shown in Fig. 1 as having been loosely placed about the shaft. The plunger may be formed in its active end with a socket or recess 5 designed to receive the adjacent end of the shaft and give support thereto as it is forced into the shrinking die. An annular rim 8 encircles the recess 5 to give support to the bushing when the shaft and bushing are being forced through the die into the constricted throat passage 2, as shown by the broken lines in Fig. 1. In passing through the flaring entranceway 3 the bushing will be subjected to a centripetal force serving to contact the same. Preferably, the shrinking is limited by actual contact of the bushing with the shaft when the shaft-bushing unit moves through the throat passage 2. This actual contact is indicated by the broken line 9 in Fig. 2.

As the shaft-bushing unit is ejected from the outlet end of the throat passage the compression on the bushing will be relieved and the bushing will be allowed to expand due to the inherent resiliency of the bushing metal. This will release the grip of the bushing on the shaft and produce the prescribed clearance, indicated at 10 in Fig. 2, sufficient for the shaft to freely rotate in the bushing. This clearance may be predetermined and will vary according to the factor of elasticity possessed by the metal from which the bushing is formed. Different alloys have been found satisfactory for this purpose and at the same time will provide a practical journal bearing for the shaft. For example, a special composition bronze will expand sufficiently, upon the release of the compressive force, to provide the desired minimum clearance for the free rotation of the shaft without objectionable play or looseness in the bushing.

After the mounting of the bushing, in accordance with the herein described method, the shaft-bushing unit may then be placed in the machine part for which it has been designed wherein the bushing will be fixed in place so that the shaft can freely journal therein.

Where it is desired to preclude the shaft against axial movement in its bushing the shaft may be formed with a peripheral groove 11 to wholly receive the bushing, or the bushing 7' may be interlocked to the shaft by an internal rib 13. Fig. 3. This interlock may readily be accomplished by placing the sleeve-like bushing over the relatively narrow groove 11' in the shaft 6' and then compressing the bushing so that its relatively soft metal will flow into the groove to form the rib 13. This results in a groove formation 12 in the bushing. The bushing supporting rim 8' extends for the full depth of the recess 5' in Fig. 3. In either embodiment the differential diameter provides a simple interlock which will prevent the shaft from axial movement in the bushing.

Fig. 4 shows a further modification wherein the bushing 7" is expanded into an internal groove 14 inside the hollow shaft or roller 15, so that when the expansive pressure is released the bushing will contract to provide the required clearance. This is a reversal of the disclosure made in Figs. 1, 2 and 3. Therefore, the terms employed in the claims to define the shrinking operation are utilized in a generic sense.

The foregoing method simplifies the manner of journaling a shaft in its bushing and eliminates the heretofore expensive step of accurately machining the two parts wherein human error so easily manifests itself. The shaft is free to rotate in its bearing with a minimum clearance which may be predetermined according to the elastic characteristic of the bushing metal. Having a minimum clearance the shaft will rotate in its bearing without any appreciable looseness or play. While the disclosure illustrates a satisfactory manner of practicing the invention it is not intended thereby to restrict the invention since the inventive concept may be practiced by the use of other equipment.

What is claimed is:

1. The method of journaling a shaft in a bearing with a predetermined clearance, consisting in forming an annular bushing from stock material having a factor of elasticity known to be substantially equal to the desired clearance and with a diameter of greater than the desired clearance with respect to the shaft, associating the bushing and the shaft the one about the other, deforming the bushing into arresting contact with the shaft to determine the extent of deforming pressure, and finally releasing the deforming pressure to enable the inherent resiliency of the bushing returning the latter from contact with the shaft to the extent of the predetermined clearance for providing journal support for the shaft.

2. The method of journaling a shaft on a bushing, consisting in selecting a bushing metal having a rebound factor capable of producing a desired clearance between the shaft and bearing, forming a bushing from the metal with a dimension giving a greater clearance and assembling the bushing with the shaft, mechanically applying a deforming radial pressure on the bushing toward the shaft until resisted by physical contact with the shaft, and then releasing the compressive force to enable the bushing so to rebound in accord with its coefficient of elasticity to free the shaft for rotation.

3. The method of journaling a shaft in a bushing, consisting in forming a bushing from metal having a clearance providing rebound factor, the bushing having a larger internal diameter than the outer diameter of the shaft with a relatively greater clearance, placing the bushing on the shaft, and thereafter subjecting the bushing to a compressive force until resisted by physical contact with the shaft, and finally releasing the pressure to free the rebound characteristic to function in freeing the shaft for rotation in the bushing.

ANTON RAPPL.

REFERENCES CITED

The following references are of record in the file of this patent:

UNITED STATES PATENTS

| Number | Name | Date |
|---|---|---|
| 290,970 | Butler | Dec. 25, 1883 |
| 1,018,207 | Mueller et al. | Feb. 20, 1912 |
| 1,080,169 | Reed | Dec. 2, 1913 |
| 1,437,144 | Isaacson | Nov. 28, 1922 |
| 1,939,444 | Geyer | Dec. 12, 1933 |
| 2,026,774 | Davis | Jan. 7, 1936 |
| 2,291,803 | Grotnes | Aug. 4, 1942 |
| 2,365,067 | Gauld | Dec. 12, 1944 |
| 2,406,963 | Norton | Sept. 3, 1946 |